Figure 1:
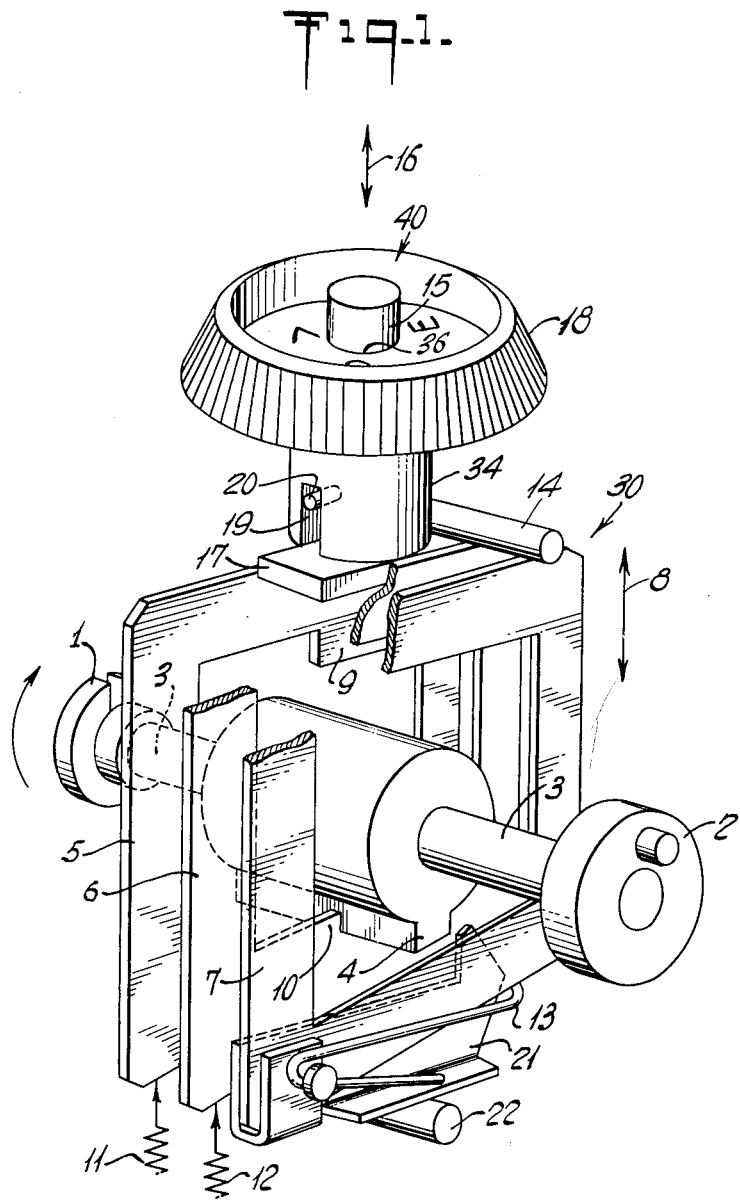

May 30, 1961  H. GÖPFERT ET AL  2,986,067
SETTABLE RELEASING ARRANGEMENT FOR
CINEMATOGRAPHIC CAMERAS
Filed Oct. 11, 1956  2 Sheets-Sheet 1

INVENTORS
HERBERT GÖPFERT
BY JOSEF BÖNISCH

ATTORNEYS

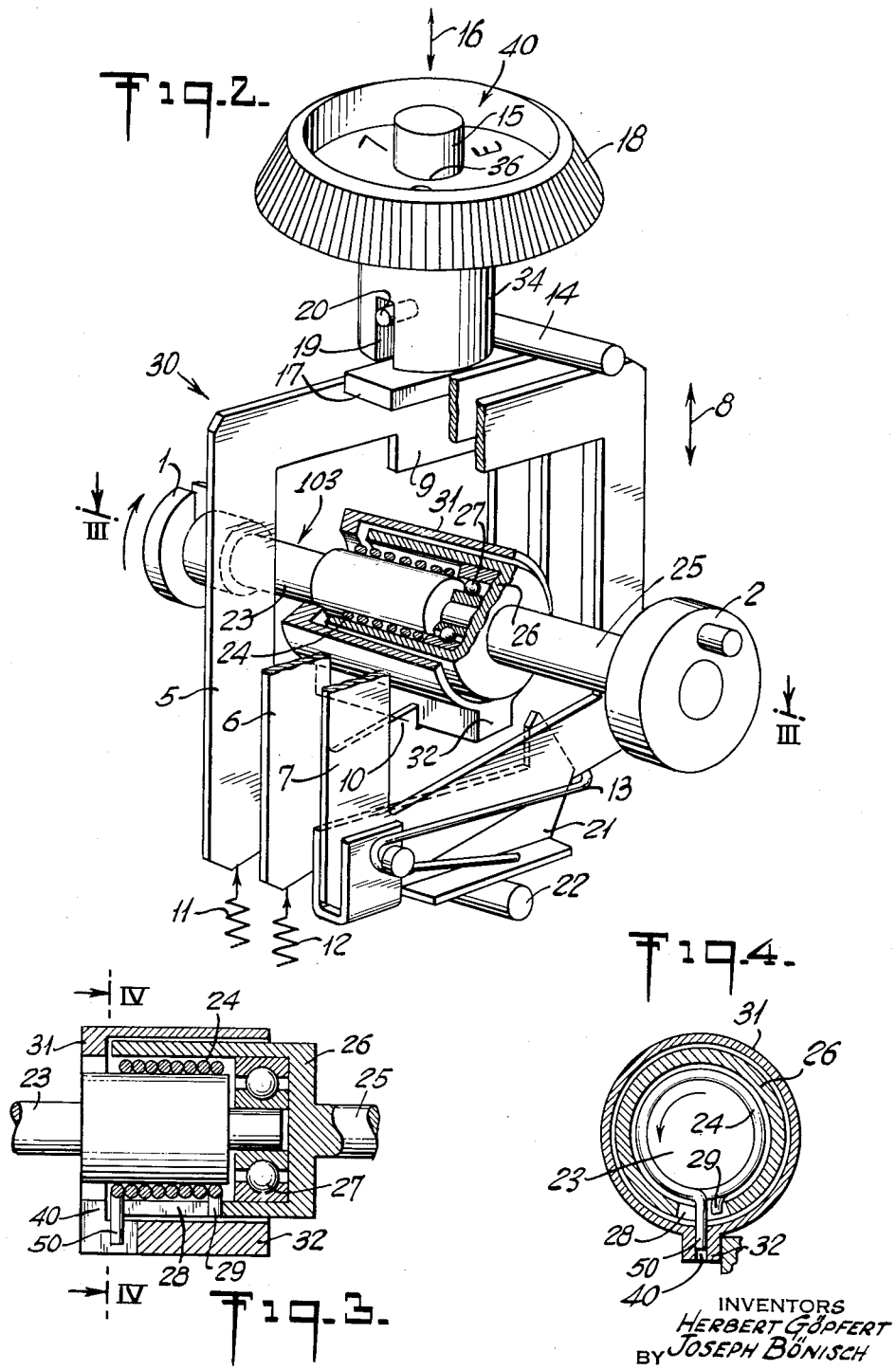

United States Patent Office 2,986,067
Patented May 30, 1961

2,986,067
SETTABLE RELEASING ARRANGEMENT FOR CINEMATOGRAPHIC CAMERAS

Herbert Göpfert, Dresden, and Josef Bönisch, Dresden-Weisser Hirsch, Germany, assignors to VEB Kamera- und Kinowerke Dresden Filed Oct. 11, 1956, Ser. No. 615,270

7 Claims. (Cl. 88—17)

This invention relates to cinematographic cameras and more particularly to cameras which are selectively settable for motion-picture action and for shooting single pictures.

It is an object of this invention to provide a settable releasing arrangement for use in conjunction with cinematographic cameras by means of which the camera may be set selectively for three different kinds of exposure action, i.e. (1) for motion-picture action, (2) for single pictures with time exposure, and (3) for single pictures with instantaneous exposure.

For the purpose of this specification and the appended claims, the terms "motion-picture action," "time exposure" and "instantaneous exposure" are deemed to have their ordinary meaning. "Motion-picture action" thus indicates a camera setting, wherein the camera effects a whole series of successive exposures, i.e. a plurality of frames are exposed successively in one operation. "Time exposure" refers to a shutter setting, wherein the shutter may be maintained in its open position for periods which are long in comparison with so-called instantaneous exposures. Such "time exposures" may be obtained by a so-called "T-setting" or a so-called "B-setting." "Instantaneous exposure" indicates the common "I-setting," wherein the shutter closes automatically within a second or a fraction of a second after opening.

A further object of this invention is the provision of a settable releasing arrangement for the purpose referred to, wherein, after a presetting of a certain type of exposure, the same releasing element may be used for the release of any one of said three different types of exposures.

Further it is an object of this invention generally to improve on settable releasing arrangements for cinematographic cameras as now customarily built.

Still a further object of this invention is the provision of a settable releasing arrangement for the purpose referred to in conjunction with means for preventing damage to the constructional elements due to the kinetic energy of the driving means of the camera, when these driving means are suddenly stopped.

Those and other objects and advantages of this invention and constructional details will become apparent from the following description when read in conjunction with the accompanying drawings forming part of this specification, wherein:

Fig. 1 is a somewhat diagrammatical, perspective view of a first embodiment of the inventive settable releasing arrangement for use in conjunction with a cinematographic camera, Fig. 2 is a somewhat diagrammatical, perspective view of a second embodiment of the inventive settable releasing arrangement with a portion of the structure broken away so as to facilitate the viewing of concealed elements, Fig. 3 is a fragmentary sectional view on line III—III of Fig. 2, and Fig. 4 is a sectional view on line IV—IV of Fig. 3.

Referring now to the drawings and in particular to Fig. 1, reference numeral 30 indicates generally a settable releasing arrangement for use in conjunction with a cinematographic camera. The settable releasing arrangement 30 here illustrated is constructed and adapted to be interpositioned as an intermediate structure between the camera mechanism proper and the power drive of the camera. The intermediate position of the arrangement 30 may be gathered from Fig. 1. One end of a driving shaft 3— the left-hand end in Fig. 1—may be coupled to the driving motor (not shown) of the camera by means of a coupling element 1, while the opposite end of the shaft 3 may be coupled to the camera mechanism proper (not shown) of the cinematographic camera by means of a coupling element 2.

The center portion of the driving shaft 3 is enlarged and carries an abutting means or stop member 4 rigid therewith. The driving shaft 3 may be made of an integral piece of material, or as later described herein, may have a shock absorbing spring coupling between its driving and driven ends.

The settable releasing arrangement 30 further comprises three frame-shaped slides 5, 6 and 7 reciprocally arranged in a housing or stationary means (not shown) in parallel relationship and spaced from each other. The driving shaft 3 passes through the openings defined by the three frame-shaped slides 5, 6 and 7. The slides 5, 6 and 7 are guided within the housing (not shown) in such a manner that they are rectilinearly reciprocable in a direction perpendicular to the driving shaft 3, i.e. in the direction of the arrow 8. The frame slide 5 is provided on its upper transverse bar with a projecting abutment or blocking element 9 integral with the bar, while a similar blocking element 10 is arranged on the lower transverse bar of the frame slide 6. The slides 5 and 6 are of substantially identical shape but are invertedly arranged so that their respective blocking elements are thus facing each other. Both blocking elements 9 and 10 are capable of cooperation with the abutting means or stop member 4 of the shaft 3 as will be explained below. The blocking element 10 of the slide 6 is normally in engagement with the abutment member 4. The slides 5, 6 and 7 are urged upwardly by springs 11, 12 and 13, respectively, and are thus normally bearing against a stationary abutment 14 capable of cooperation with all three slides and forming part of the stationary means or housing (not shown) of the arrangement 30.

The settable releasing arrangement 30 comprises further a pre-setting and releasing mechanism generally indicated by reference numeral 40. Said mechanism 40 includes a release element or rod 15 rigid with a presetting plate 17. The release element with its plate 17 is mounted so as to be reciprocably movable in a direction perpendicular to the shaft 3, i.e. in the direction of arrow 16. The hub portion 34 of a knurled adjusting knob 18 is rotatably mounted in the stationary means or housing (not shown) of the arrangement coaxially with the release element 15. The rod-like release element 15 is slidably mounted in a longitudinal center bore 36 of the knob. The upper end of said rod 15 protrudes from the knob 18 when said release rod 15 is in the non-releasing position shown in Fig. 1. The knob 18 and the release element 15 are operatively engaged with each other by the provision of a pin 20 rigid with the release element 15 and engaging in a recess or slot of the hub portion 34. When the knob 18 is turned the release element 15 is thus corotated for presetting the pre-setting plate 17 in one or the other of three pre-setting positions to be described hereinafter.

The distances between the slides 5, 6 and 7 are adapted in such a manner that—dependent on the position of the knob 18—the pre-setting plate 17 will be situated either above and in register with the intermediate slide 6 only in its first pre-setting position or above and in register with the intermediate slide 6 and one of the slides 5 and 7 in its second or third pre-setting position, respectively.

A pawl-like catching element 21 is rockably mounted in the lower portion of the frame slide 7 which element 21 bears against a lower abutment 22 stationarily fixed to the housing or stationary means (not shown). The spring 13 which urges the slide 7 against the upper abutment 14 is double-acting and thus also urges the catching element 21 in the opposite direction, i.e. into engagement with the lower abutment 22.

The operation of the settable release arrangement here illustrated is as follows:

I. Operation for a series of exposures (motion-picture action)

When the adjusting knob 18 and pre-setting element 17 are in the position shown in Fig. 1, the arrangement 30 is set for motion-picture action. As may be readily gathered from Fig. 1, the adjusting knob 18 is in a position in which the pre-setting plate 17 is situated in its first pre-setting position in register with the intermediate or blocking slide 6 only, without being capable of cooperation with the slides 5 and 7. The spring 12 normally urging the blocking slide 6 upwardly against the stop 14 holds the abutment 10 in the path of the abutment 4 on the driving shaft 3, so that the latter is prevented from rotation. Upon depressing the release element 15, the intermediate or blocking slide 6 is urged downwardly into its effective releasing position by the plate 17 against the action of spring 12. This in turn results in the release of the abutment member 4 by the blocking element 10 of the intermediate or blocking slide 6. The shaft 3 can thus be freely rotated by the motor (not shown) as long as the release element 15 is pressed down. The rotative motion of the shaft 3 is transmitted to the camera mechanism proper (not shown) to which the shaft 3 may be coupled by the coupling element 2. The camera mechanism is thus continuously actuated to cause a continuous series of exposures in known manner. When the pressure on the release element 15 is discontinued the spring 12 urges the blocking slide 6 upwardly until the latter again is in its normal blocking position, i.e. the position in which the blocking slide 6 bears against the stationary upper abutment 14. Due to the return of the blocking slide 6 into its normal blocking position, the projecting blocking element 10 of the slide 6 is again moved within the path of the abutment element 4 of the driving shaft 3, whereby the latter is again blocked and the operation of the camera comes to a standstill. It will thus be realized that any desired number of continuous exposures can be effected.

II. Operation for a single picture with time exposure

The adjusting knob 18 is turned until it reaches a pre-setting position in which the pre-setting plate 17 is situated above and in register with both the intermediate or blocking slide 6 and the time exposure controlling slide 5. Upon depressing the release element 15, both the blocking slide 6 and the time exposure controlling slide 5 are thus moved downwardly by the plate 17 against the action of springs 12 and 11, respectively, into a releasing or effective position, respectively. As described above in the operation for motion-picture action, the blocking slide 6 thus releases the abutment member 4, whereby the driving shaft 3 may be rotated by the driving motor (not shown). However, due to the fact that the time exposure controlling slide 5 has been moved downwardly as well, the projecting blocking element 9 rigid with the latter is moved into the path of the abutment element 4 of the rotating driving shaft 3. Thus, the driving shaft 3 can be rotated through one half of a revolution only, since thereafter the abutment element 4 on the shaft 3 comes to bear against the blocking element 9 on the time exposure controlling slide 5, whereby the rotation of the driving shaft is interrupted. The camera mechanism (not shown) of the camera is adapted in such a manner that the camera shutter is open in this blocked position of the shaft 3. It will be realized that such synchronization between the shutter action and the rotation of the driving shaft 3 may be readily effected. Since the camera mechanism is operated by the driving shaft 3 and the shutter action in turn is controlled by the camera mechanism, it will be readily understood that the shutter will remain open until the driving shaft is released again by the blocking element 9 of the time exposure controlling slide 5. Any desired exposure time can thus be chosen. When the pressure upon the release element 15 is discontinued, the time exposure controlling slide 5 and the blocking slide 6 are moved upwardly again by the action of the springs 11 and 12, respectively, into their ineffective and blocking positions, respectively. The abutment element 4 on the driving shaft 3 is thus released and the driving motor can again rotate the driving shaft 3, whereby in turn the camera mechanism is actuated. However, the upward movement of the blocking slide 6 brings the blocking element 10 again within the path of the abutment element 4 of the rotating driving shaft 3. This in turn results in a renewed blocking of the driving shaft 3 after one half of a revolution. The camera mechanism meanwhile has caused the closure of the shutter, whereby the film gate is covered again. The principle underlying the operation of the settable release arrangement for use in time exposures is thus that the driving shaft is rotated for one half of a revolution so as to cause the opening of the shutter, whereafter—subsequent to the desired exposure time—upon a release of the release element 15 the driving shaft 3 is made to complete its revolution so as to cause the closing of the shutter. The shutter is thus synchronized with the driving shaft so that one complete cycle of shutter action is effected upon one revolution of the driving shaft. The above described action may be compared with the action for a so-called B-setting of a customary shutter mechanism.

III. Operation for single pictures with instantaneous exposure

The adjusting knob 18 is turned until it reaches a position in which the pre-setting plate 17 is situated in another pre-setting position wherein the latter is in register with both the blocking slide 6 and the instantaneous exposure controlling slide 7. Upon depressing the release element 15 both the blocking slide 6 and the instantaneous exposure controlling slide 7 are thus moved downwardly by the plate 17 against the action of springs 12 and 13, respectively, into a releasing or effective position respectively. As previously explained, the downward movement of the blocking slide 6 causes the release of the abutment member 4 of the driving shaft 3, whereby the latter is freely rotated by the driving motor (not shown). However, the downward movement of the instantaneous exposure controlling slide 7 causes a rocking movement of the catching element 21 which latter is pivoted on the slide 7 and bears against the stationary abutment 22. It will be realized that upon a downward movement of the instantaneous exposure controlling slide 7 relative to the stationarily arranged abutment or stop 22, the catching element 21 will turn about its pivot on the slide 7 and move along the surface of the rod-like stationary abutment 22 against the action of the double-acting spring 13. The catching element 21 is thus rocked into an active position within the range of the path of the abutment element 4 of the driving shaft 3, wherein the position of the active portion of the catching element 21 is slightly ahead of the position of the abutment 10 on the blocking slide 6. Therefore the driving shaft 3, rotated by the driving motor, cannot complete a full revolution and is thus blocked shortly before the completion of a full revolution by the cooperating engagement of the active portion of the catching element 21 and the abutment 4. As previously pointed out, the shutter action of the camera—through the coupling of the driving shaft 3 to the camera mechanism—is synchronized with the rotation of the driving shaft. The coordination between the rotation of the driving shaft 3 and the shutter action is such that during an almost but not entirely complete full revolution of the driving shaft 3, the shutter causes an instantaneous exposure of a single picture. When the pressure applied on the release element 15 is discontinued, the blocking slide 6 and the intermediate exposure controlling slide 7 are returned into their normal blocking or ineffective positions respectively by the action of the springs 12 and 13. The blocking element or abutment 10 of the blocking slide 6 is thus reengaged with the abutment element 4 of the driving shaft 3 for blocking same at the end of the now completed single revolution, while the catching element 21 is rocked by the action of the double-acting spring 13 out of the path of the abutment element 4 and back into its inactive position shown in Fig. 1.

Figs. 2 to 4 illustrate an embodiment of an inventive settable releasing arrangement in conjunction with means for preventing damage to the elements of the arrangement and the camera mechanism, when the camera action is suddenly stopped by the operation of the blocking means of the inventive arrangement. Such damage might otherwise occur due to the kinetic energy of the driving motor of the camera. These damage-preventing means comprise a spring coupling to be explained below.

The elements of the settable releasing arrangement proper described and illustrated in connection with the first embodiment of Fig. 1, are also contained in part in the embodiment of Figs. 2 to 4 so that it is deemed unnecessary to repeat the description of these elements and their functioning. According to Figs. 2 to 4, the driving shaft generally indicated by 103 comprises a driving shaft portion 23 and a driven shaft portion 25, which shaft portions are in alignment. The coupling element 1 provided for coupling the driving shaft 103 to the driving motor (not shown) is mounted on the driving shaft portion 23, while the coupling element 2 which latter couples the driving shaft 103 to the camera mechanism (not shown) is mounted on the driven shaft portion 25.

A coupling spring 24 is wound around the driving shaft portion 23. The end of the driven shaft portion 25 facing the shaft portion 23 (the left-hand end in Figs. 2 and 3) is rigid with a hollow cylindrical portion 26, which cylindrical portion 26 surrounds the right-hand end of the driving shaft portion 23 with the spring 24 wound thereon. A ball bearing 27 is provided in the space defined by the cylindrical portion 26, and the right-hand end of the driving shaft portion 23 is guided in this ball bearing 27. A recess 28 is provided in the cylindrical portion 26. The ends 29 and 50 of the coupling spring 24 project into this recess 28. The end 50 of said coupling spring 24 passes through and projects from said recess 28. The projecting portion of said end 50 of the coupling spring 24 is engaged with a recess 40 of a jacket or sleeve 31 which jacket 31 surrounds the cylindrical portion 26 concentrically and is rotatable relative thereto. The portion 32 of the jacket 31 having the recess 40 engaged with the spring end 50 forms an abutment 32 which serves the same purpose as the abutment element 4 of the embodiment of Fig. 1. The length of the abutment 32 is chosen in such a manner that the abutment 32 is situated within the moving path of the blocking elements 9 and 10 of the time exposure controlling slide 5 and blocking slide 6, respectively, and of the catching element 21 of the instantaneous exposure controlling slide 7. If now one of the blocking elements 9 or 10, respectively, or the catching element 21 intersects the path of the rotating abutment 32 engaged with the spring end 50, the coupling spring 24 is prevented from further rotation. Therefore the driven shaft section 25 engaged with the other end 29 of the coupling spring 24 and operatively coupled to the camera mechanism is stopped in a predetermined position. Simultaneously with said stoppage of the driven shaft 25 (and camera mechanism respectively) by the action of the stopped end 50 of the spring 24, the coupling between the driving shaft portion 23 (or driving motor respectively) and the driven shaft portion 25 (or camera mechanism respectively) is also disengaged owing to the stoppage of the ends 50 and 29 of the spring 24.

It is of course also possible, and thus within the scope of the present invention, to provide means on the settable releasing arrangement for temporarily locking the release element 15 in its depressed releasing position, so that a so-called "continuous motion picture action" may be readily obtained without the necessity of a continuous manual pressure on the release element 15.

Further, it is within the scope of this invention to provide the inventive settable releasing arrangement with a retard mechanism, which enables the setting and thus performance of automatic instantaneous exposures of predetermined duration.

Moreover, it is possible to connect the release element 15 with a wire release arrangement known per se.

It is pointed out that the inventive settable releasing arrangement need not, of course, be constructed as a separate unit or attachment as illustrated by the drawings, which is interposed between the driving motor and the camera mechanism. Obviously, it is feasible to build the settable releasing arrangement into the camera casing proper so as to obtain a unitary construction. Furthermore, if desired, the driving motor may be combined with the settable releasing arrangement so as to form a constructional unit, which in turn may be coupled with the mechanism of a cinematographic camera.

From the above description it will be realized, that the invention provides a settable releasing arrangement for use in cinematographic camera, which makes it possible to adjust the camera so as to obtain motion-picture action, single pictures with time exposure and single pictures with instantaneous exposure. All three kinds of exposure can be obtained by actuating one and the same release element 15; it is merely necessary to pre-set the pre-setting element 17 beforehand in one of three predetermined pre-setting positions by means of the adjusting knob 18.

The inventive settable releasing arrangement comprises preferably an abutment element rigid with the driving shaft, and blocking or limiting means capable of cooperation with said abutment element. These blocking or limiting means preferably comprise frame-shaped slides arranged in parallel relationship one behind the other, which slides are actuated by the release mechanism of the arrangement so as to move in a direction perpendicular to the driving shaft.

According to a further feature of the invention, one slide pertains to each of the desired kinds of exposure, so that accordingly three separate slides, a blocking slide, a time exposure controlling slide and an instantaneous exposure controlling slide, are provided. One of these slides, i.e. the blocking slide, which advantageously is arranged between the two other slides, carries a blocking element which is in abutting engagement with the abutment on the driving shaft when the releasing element of the release arrangement is in its inactive position.

If, in dependence on the setting of the pre-setting element 17, this intermediate blocking slide only is actuated independent of the other slides, then the arrangement is adjusted for causing motion-picture action by the camera.

One of the two other slides, i.e. the time exposure controlling slide, advantageously carries a blocking element which upon actuation of said slide by the release mechanism is brought within the range of the abutment of the rotating driving shaft. This latter blocking element is arranged in such a manner that it comes into engagement with the abutment on the driving shaft after one half of a revolution of the driving shaft, whereby the rotation of the latter is interrupted. The camera mechanism which controls the shutter action is synchronized with the driving shaft in such a manner that the camera shutter is open after such one half of a revolution of the driving shaft. As has been explained, upon simultaneous actuation of the blocking slide 6 and the time exposure controlling slide 5 by the release mechanism through the medium of the pre-setting element 17, the driving shaft is first released by the blocking element of the blocking slide 6 so that the driving shaft may rotate, whereupon the driving shaft is blocked again by the blocking element of the time exposure controlling slide 5 after having rotated for one half of a revolution. When the release mechanism is then returned into its inactive position, the blocking engagement between the blocking element of the time exposure controlling slide 5 is dissolved, whereby the driving shaft can rotate for a further half of a revolution, whereafter it is again blocked by the cooperation of the abutment element 4 and the blocking element of the blocking slide 6. In this position of the driving shaft, i.e. after one complete revolution, the shutter has been closed again so that the film gate of the camera is covered. By the simultaneous actuation of the two slides referred to time exposures of any desired duration may thus be carried out.

The third slide, i.e. the instantaneous exposure controlling slide, advantageously carries a catching or stopping element 21 which upon actuation of this third slide by the release mechanism is brought within the path of the abutment 4 of the driving shaft. The catching element is positioned relative to the abutment in such a manner, that the driving shaft may rotate almost one full revolution before being blocked by the engagement of the catching element with the abutment. Upon simultaneous actuation of the blocking slide 6 and the instantaneous exposure controlling slide 7 by the release mechanism, the blocking element on the blocking slide releases the abutment on the driving shaft so that the latter may rotate for almost one complete revolution whereafter it is blocked again by the catching element engaging the abutment, so that a single picture with an instantaneous exposure may be taken.

According to a preferred embodiment of the release mechanism, which release mechanism enables the actuation of either the intermediate slide 6 or the actuation of the intermediate slide 6 with one of the two other slides 5, 7, a release element 15 is provided which rigidly carries a pre-settable controlling plate 17. Said release element 15 being slidable in the bore of a rotatable adjusting knob 18 is also positively connected with the latter for the performance of rotations, whereby said release element and the pre-settable controlling plate 17 rigidly connected therewith may be rotated in one or the other of above described three pre-setting positions for obtaining the desired type of exposure by the camera. The three kinds of exposure may advantageously be indicated on the knob 18 so that the operator may simply set the knob into the desired position.

In accordance with the preferred embodiment of the settable releasing arrangement, the slides are constructed as open frames and the driving shaft passes through the openings of the frame slides. Further, the blocking slide 6 and the time exposure controlling slide 5 comprise projecting portions integral with the slides, which projective portions serve as the blocking elements referred to. These two slides may thus be of identical design. However, on assembling the control arrangement said two slides are arranged in such a manner that the projecting portions or blocking elements extend in opposite directions.

According to a further feature of this invention the inventive settable release arrangement may be used in conjunction with means for preventing damage to the various mechanisms by the kinetic energy of the driving mechanism to be stopped. For this purpose, the driving shaft may comprise two shaft portions which are coupled by a spring coupling. In accordance with a preferred embodiment of such spring coupling, the disengagement between the driving shaft portion and the driven shaft portion as well as the stopping of the driven shaft portion in a predetermined position are obtained by the abutting cooperation of one end of the spring with one of the blocking or limiting abutments on said slides. In order to be able to employ this coupling principle for the inventive settable release arrangement, one end of the coupling spring is held in a sleeve 31 having an abutting portion 32, the abutting surface of which is within the range of the blocking or limiting elements, respectively, of all three slides 5, 6, 7. The sleeve 31 including the abutting portion 32 is rotatable relative to a cylindrical portion 26 rigid with the driven shaft portion 25 which may be coupled with the camera mechanism. This cylinder surrounds in turn the coupling spring which is wound around one driving shaft portion 23 coupled to the driving mechanism.

We have described preferred embodiments of our invention, but it is understood that this disclosure is for the purpose of illustration, and that various changes in shape and proportion, as well as the substitution of equivalent elements for those herein shown and described may be made without departing from the spirit and scope of the invention as set forth in the appended claims.

What we claim is:

1. A settable releasing arrangement for selectively effecting motion picture action, time exposure and instantaneous exposure in a cinematographic camera, comprising in combination: a rotatable shaft for connection with a power drive and with a cinematographic camera mechanism, said shaft including a first shaft portion and a second shaft portion, said first portion serving as the driving and said second portion as the driven shaft portion, abutting means mounted about said shaft, coupling means connecting said first shaft portion with said second portion and including within said abutting means a helical spring disposed around said first portion and frictionally engaged therewith, a hollow cylinder integral with said second portion and substantially surrounding said spring, bearing means adapted to rotatably and coaxially guide said first portion in relation to said second portion, a recess in said cylinder lodging the projecting ends of said spring, said abutting means retaining one of said ends, whereby said spring serves to arrest said driven portion while simultaneously frictionally disengaging said driven portion from said driving portion, a first slide for controlling motion picture exposures, reciprocable between an inactivated blocking position in engagement with said abutting means and an activated releasing position disengaged from said abutting means, a second slide for controlling time exposures and a third slide for controlling instantaneous exposures, said second and said third slide being each reciprocable between an inactivated ineffective and an activated catching position in which said abutting means is engageable with said second and said third slide upon rotation of said abutting means from its position in engagement with said first slide, said rotation representing a first predetermined angle before engagement with said second slide and a second predetermined angle before engagement with said third slide, said slides being all arranged sequentially in the direction of the longitudinal axis of said shaft and reciprocable rectilinearly in a direction substantially perpendicular to said axis, biasing means cooperating with said slides for normally holding them in their inactivated positions, pre-setting means selectively settable in one of three pre-setting positions, in the first position for cooperation with said first slide, and in the second and third positions for simultaneous cooperation with both said first and one of said second and third slides, adjusting means cooperating with said pre-setting means for setting the latter in one of said three positions, said pre-setting means being reciprocable between a rest and a releasing position, releasing means cooperating with said pre-setting means for moving the latter from said rest to said releasing position, said slides being in their inactivated positions when said pre-setting means is in said rest position, so that said pre-setting means will, upon reaching said releasing position, selectively release said abutting means for free rotation and engage said abutting means after its rotation through said first and said second angles, respectively, in response to its setting in one of said three positions, while said presetting means will engage said abutting means while in said rest position, whereby in said three positions the free rotation of said abutting means will result in motion picture action, the rotation through said first angle in a time exposure and the rotation through said second angle in an instantaneous exposure in the cinematographic camera.

2. A settable releasing arrangement as in claim 1 wherein said abutting means includes a sleeve overlapping both of said shaft portions and an abutting projection, said abutting projection forming a relatively wide projecting contact face along a portion of the length of said sleeve and rigidly mounted on said sleeve, said sleeve surrounding at least part of said cylindrical portion and being concentrically rotatable thereabout, one of said projecting ends of said spring in said recess projecting past said cylinder and into said abutting projection.

3. A settable releasing arrangement for selectively effecting motion picture action, time exposure and instantaneous exposure in a cinematographic camera, comprising in combination: a driving shaft, a driven shaft coaxially disposed with respect to said driving shaft and abutting said driving shaft, a hollow cylinder integral with said driven shaft, coaxially disposed about said driving shaft, a sleeve rotatably mounted about said hollow cylinder, a hollow abutting surface longitudinally secured to said sleeve, an axial recess in said abutting surface extending to the inner diameter of said sleeve, coiled spring means coaxially disposed about said driving shaft in said hollow cylinder and in frictional engagement with said driving shaft, said coiled spring means having two ends, an axial recess in said hollow cylinder, a first end of said coiled spring means extending into said recess in said hollow cylinder, a second end of said coiled spring means extending into said recess in said sleeve wherein resilient engagement is provided between said hollow cylinder and said sleeve, said spring means being wound in such a direction wherein a force on said abutting surface counter to rotation of said shaft tends to uncoil said spring means and reduce frictional engagement between said spring means and said driving shaft, said spring means providing coupling between said driving shaft and said driven shaft during frictional engagement of said spring means to said driving shaft, a plurality of linearly reciprocal blocking slides selectively adaptable to allow predetermined angular movement of said abutting surface, means on said blocking slides adapted to interrupt rotary movement of said abutting surface counter to the rotation of said driving shaft whereby said driven shaft is disengaged from said driving shaft and said driving shaft may continue to idle.

4. A settable releasing arrangement for selectively effecting motion picture action, time exposure and instantaneous exposure in a motion picture camera, comprising in combination: a drive shaft adapted to be connected to a power drive, a driven shaft coaxially mounted with respect and adjacent to said drive shaft and adapted to drive a motion picture mechanism, a coil spring wound about the end of said drive shaft adjacent said driven shaft for frictional engagement with said drive shaft, said coil spring having radially projecting ends, inner sleeve means keyed to said driven shaft and surrounding said coil spring, said inner sleeve means having an opening for receiving said ends of said coil spring, outer sleeve means surrounding said inner sleeve means, having an opening for receiving one of said ends of said coil spring, a radial projection on said outer sleeve means, a plurality of blocking slides transverse to the longitudinal direction of said shafts and arranged about said shafts, said blocking slides being selectively movable transversely to the direction of said shafts and having means for engagement with said projection on said outer sleeve, each of said blocking slides being reciprocable between a blocking position in engagement with said projection and an effective releasing position disengaged from said projection, each of said blocking slides being selectively movable so as to effect blocking positions for time exposures, individual exposures and motion picture action, said drive shaft being operative, upon said projection being released, to frictionally drive said driven shaft by way of the engagement of the end of said coil spring with said inner sleeve means, said projection being effective upon being blocked by said blocking slides so as to impart energy to said coil spring to open the same, said coil spring being effective to absorb the impact of the blocking slides and release said drive shaft whereby said drive shaft continues to rotate and said driven shaft is stopped.

5. An arrangement as in claim 4 wherein said opening of said inner sleeve extends along an arc of said inner sleeve greater than said opening of said outer sleeve, whereby said outer sleeve is rotatable with respect to said inner sleeve.

6. A settable releasing arrangement for selectively effecting motion picture action and instantaneous exposure in a motion picture camera, comprising in combination: a drive shaft adapted to be connected to a power drive, a driven shaft coaxially mounted with respect and adjacent to said drive shaft and adapted to drive a motion picture mechanism, a coil spring wound about the end of said drive shaft adjacent said driven shaft for frictional engagement with said drive shaft, said coil spring having radially projecting ends, inner sleeve means keyed to said driven shaft and surrounding said coil spring, said inner sleeve means having an opening for receiving said ends of said coil spring, outer sleeve means surrounding said inner sleeve means, having an opening for receiving one of said ends of said coil spring, a radial projection on said outer sleeve means, means for selectively blocking and releasing said projection, said drive shaft being operative, upon said projection being released, to frictionally drive said driven shaft by way of the engagement of the end of said coil spring with said inner sleeve means, said projection being effective upon being blocked by said means for blocking so as to impart energy to said coil spring to open the same, said coil spring being effective to absorb the impact of said means for blocking and release said drive shaft whereby said drive shaft continues to rotate and said driven shaft is stopped.

7. An arrangement as in claim 6 wherein said opening of said inner slide extends along an arc of said inner sleeve greater than said opening of said outer sleeve, whereby said outer sleeve is rotatable with respect to said inner sleeve.

References Cited in the file of this patent

UNITED STATES PATENTS

| 1,272,798 | Green | July 16, 1918 |
| 1,483,105 | Michetti | Feb. 12, 1924 |
| 2,034,543 | Twiss et al. | Mar. 17, 1936 |
| 2,462,302 | Bolsey | Feb. 22, 1949 |
| 2,751,815 | Larson | June 26, 1956 |

FOREIGN PATENTS

| 868,268 | France | Sept. 22, 1941 |
| 594,084 | Great Britain | Nov. 3, 1947 |
| 598,967 | Great Britain | Mar. 2, 1948 |